United States Patent
Suh

(10) Patent No.: US 11,213,013 B2
(45) Date of Patent: Jan. 4, 2022

(54) TRAINING ROBOT HAVING A SNACK DISCHARGING FUNCTION FOR HEALTH PROMOTION OF A PET

(71) Applicant: VARRAM SYSTEM CO., LTD., Daejeon (KR)

(72) Inventor: Byung Jo Suh, Daejeon (KR)

(73) Assignee: Varram System Co., Ltd., Daejeon (KR)

(*) Notice: Subject to any disclaimer, the term of this patent is extended or adjusted under 35 U.S.C. 154(b) by 0 days.

(21) Appl. No.: 16/305,489

(22) PCT Filed: Sep. 13, 2018

(86) PCT No.: PCT/KR2018/010734
§ 371 (c)(1),
(2) Date: Feb. 1, 2019

(87) PCT Pub. No.: WO2020/054887
PCT Pub. Date: Mar. 19, 2020

(65) Prior Publication Data
US 2021/0244000 A1 Aug. 12, 2021

(30) Foreign Application Priority Data
Sep. 13, 2018 (KR) .................. 10-2018-0109313

(51) Int. Cl.
*A01K 15/02* (2006.01)
*B25J 9/00* (2006.01)
(Continued)

(52) U.S. Cl.
CPC ............ *A01K 15/02* (2013.01); *A01K 5/0114* (2013.01); *B25J 9/0003* (2013.01); *B25J 11/008* (2013.01); *B25J 13/089* (2013.01); *G05D 1/0238* (2013.01)

(58) Field of Classification Search
CPC .. A01K 15/025; A01K 15/021; A01K 5/0114; A01K 15/026; A01K 15/027;
(Continued)

(56) References Cited

U.S. PATENT DOCUMENTS 6,158,391 A * 12/2000 Simonetti ............ A01K 5/0114
119/702
6,453,602 B1 * 9/2002 Russell .................. A01K 69/06
43/100
(Continued)

FOREIGN PATENT DOCUMENTS

JP 2008539778 A 11/2008
KR 10-2003-0013769 A 2/2003
(Continued)

OTHER PUBLICATIONS

International Search Report Corresponding to PCT/KR2018/010734 dated May 20, 2019.
(Continued)

*Primary Examiner* — Yvonne R Abbott-Lewis
(74) *Attorney, Agent, or Firm* — Finch & Maloney, PLLC; Michael J. Bujold; Jay S. Franklin

(57) ABSTRACT

Provided is a training robot having a snack discharging function for health promotion of a pet, the training robot including a moving means; a base having an insertion groove into which a snack box comprising a discharge hole connected to an external space may be inserted; a first driving means disposed between the moving means and the base and connected to the moving means; a second driving means disposed between the moving means and the base and connected to the snack box; and a control means configured to control a snack in the snack box to be discharged to an outside through the discharge hole, wherein the first driving
(Continued)

means drives the moving means to move the training robot and the second driving means rotates the snack box.

5 Claims, 8 Drawing Sheets

(51) Int. Cl.
*A01K 5/01* (2006.01)
*B25J 11/00* (2006.01)
*B25J 13/08* (2006.01)
*G05D 1/02* (2020.01)

(58) Field of Classification Search
CPC ......... A01K 5/02; B25J 9/0003; B25J 11/008; B25J 13/089
USPC ......... 119/707, 702, 51.02, 57.92; 901/1, 46
See application file for complete search history.

(56) References Cited

U.S. PATENT DOCUMENTS

| | | | | |
|---|---|---|---|---|
| 7,631,613 | B2* | 12/2009 | Lescroart | A01K 15/025 |
| | | | | 119/51.01 |
| 8,707,900 | B1* | 4/2014 | Womble | A01K 15/025 |
| | | | | 119/51.5 |
| 10,390,517 | B2* | 8/2019 | Wilson | A01K 15/025 |
| 10,959,407 | B2* | 3/2021 | Christensen | A01K 15/025 |
| 11,006,615 | B1* | 5/2021 | Xu | G05D 1/0238 |
| 2008/0083378 | A1* | 4/2008 | Pearce | A01K 5/0114 |
| | | | | 119/707 |
| 2011/0226187 | A1* | 9/2011 | Bertsch | A01K 5/0114 |
| | | | | 119/61.55 |
| 2015/0342145 | A1* | 12/2015 | Christianson | A01K 29/00 |
| | | | | 119/51.11 |
| 2016/0219835 | A1* | 8/2016 | Faecher | A01K 27/009 |
| 2017/0064926 | A1* | 3/2017 | Gutierrez | A01K 5/00 |
| 2018/0199541 | A1* | 7/2018 | Huang | A01K 5/0114 |
| 2018/0303062 | A1* | 10/2018 | Simard | A01K 15/021 |
| 2020/0093092 | A1* | 3/2020 | Soug | B25J 9/1669 |
| 2020/0178495 | A1* | 6/2020 | Womble | A01K 5/0114 |
| 2020/0221668 | A1* | 7/2020 | Suh | A01K 15/025 |
| 2020/0315138 | A1* | 10/2020 | Mundell | A01K 5/0114 |

FOREIGN PATENT DOCUMENTS

| | | |
|---|---|---|
| KR | 10-1373321 B1 | 3/2014 |
| KR | 101727483 B1 | 4/2017 |
| KR | 101817736 B1 | 2/2018 |
| KR | 1020180089241 | 8/2018 |

OTHER PUBLICATIONS

Written Opinion Corresponding to PCT/KR2018/010734 dated May 20, 2019.
Korean Office Action issued in corresponding Korean Patent Application No. 10-2018-0109313 dated Oct. 17, 2018.

* cited by examiner

TRAINING ROBOT HAVING A SNACK DISCHARGING FUNCTION FOR HEALTH PROMOTION OF A PET

TECHNICAL FIELD

The present disclosure relates to a training robot having a snack discharging function, and more particularly, to a training robot capable of supplying a snack to a pet while exercising the pet by discharging the snack according to a control signal while the training robot moves manually or automatically.

BACKGROUND ART

When a family, whom have recently moved from their hometown and live alone in another province, gradually grows, people who raise pets such as dogs and cats to appease their loneliness are increasing. As the number of houses for single-family and dual-income increases, the time required for the pets to stay alone at home increases, a device capable of caring for the pets at a remote location is needed.

Korean Patent No. 10-1373321 discloses a pet automatic feeding device comprising a housing 10 forming an outer appearance, a feed supply means 30 provided at one side of the housing 10 for selectively feeding food, a water supply means 70 provided at one side of the housing 10 for selectively supplying drinking water and having a temperature sensor 73 installed therein for sensing the temperature of stored water, a feed box 50 provided at one side of the feed supply means 30 and storing the feed supplied by the feed supply means 30, a water supply tube 90 provided at one side of the water supply means 70 and storing drinking water supplied by the water supply means 70, an opening and closing door 62 formed in a pair and moving left and right for opening and closing the food box 50 and the water supply tube 90, an opening and closing means 60 coupled with the opening and closing door 62, formed as rotary motor 66 for selectively feeding the opening and closing door 62 to the left and right to selectively open and close the feed box 50 and the water supply tube 90, a weight detection sensor 52 installed below the feed box 50 and for sensing the weight of the feed box 50 to supply a predetermined amount of feed, and a heater 74 installed inside the water supply means 70 and for selectively heating the water supply means 70, and further comprising a camera module 20 for photographing a pet on one side of the housing 10, wherein the camera module 20 compares stored image information with photographed image information to detect the pet.

The prior publication relates to a fixed feeding device that may only observe pets through a camera and supply only automatic feed, and thus there is a problem that it is impossible to exercise and train the pets or play with the pets.

DISCLOSURE

Technical Problem

The present invention has been made to solve the above-mentioned problems, and provides a training robot having a snack discharging function for health promotion of a pet which is simple in structure and may be miniaturized by having a structure for discharging a snack by rotating a snack box.

The present invention provides a training robot having a snack discharging function for health promotion of a pet which may easily clean a snack box not only by conveniently mounting the snack box on the training robot but also easily separating the snack box from the training robot.

Also, the present invention provides a training robot having a snack discharging function for health promotion of a pet which may prevent a snack from being abnormally discharged to the outside by controlling a snack box to return to its original position after rotation and installing a cover at the opposite side of the snack box.

Other objects and advantages of the present invention may be understood by the following description, and will be more clearly understood by the embodiments of the present invention. It will also be readily apparent that the objects and advantages of the invention may be realized and attained by means of the instrumentalities and combinations particularly pointed out in the appended claims.

Technical Solution

According to an aspect of the present disclosure, a training robot having a snack discharging function for health promotion of a pet includes a moving means; a base having an insertion groove into which a snack box comprising a discharge hole connected to an external space may be inserted; a first driving means disposed between the moving means and the base and connected to the moving means; a second driving means disposed between the moving means and the base and connected to the snack box; and a control means configured to control a snack in the snack box to be discharged to an outside through the discharge hole, wherein the first driving means drives the moving means to move the training robot and the second driving means rotates the snack box.

The training robot may further include a housing surrounding the base to prevent the pet from touching the snack box.

The inserting groove of the base may have a depth at which a part of the snack box is exposed in a state where the snack box is inserted.

The snack box may include a protrusion on each of two end surfaces, the base may include a fixing groove mechanically connected to the second driving means and configured to receive the protrusion of the snack box, and the second driving means may be configured to be mechanically connected to the fixing groove and rotate the fixing groove to rotate the snack box.

The snack box may include a first box having a fastening groove; and a second box having a projection formed so as to be fitted into the fastening groove, thereby facilitating cleaning of the snack box.

The snack box may include a first box including a first half-hole formed at an end and configured to insert or discharge the snack; and a second box including a second half-hole formed at an end of a part opposite to the first hole and configured to insert or discharge the snack, and wherein the first hole and the second hole are combined with each other when the first box and the second box are combined with each other to form a completed snack box hole.

The control means may be configured to output a sound set through a sound output means and then rotate the snack box and discharge the snack.

The training robot may further include a position detection sensor capable of detecting a rotational position of the snack box, wherein the control means is configured to rotate the snack box to control the snack in the snack box to be discharged through a discharge hole connected to the outside such that the snack box returns to a specific position and stops using rotational position information detected through the position detection sensor.

The snack box may further include a snack box hole, and wherein the control means is configured to control the snack box hole of the snack box to stop in a direction in which a cover exists by using the rotational position information detected through the sensor.

The training robot may further include a position detection sensor capable of detecting a rotational position of the snack box, wherein the snack box further includes a snack box hole, and wherein the control means is configured to control the snack in the snack box to be easily discharged to the outside through the discharge hole by shaking the snack box by a predetermined number of times when the snack box hole enters a set distance from the discharge hole using rotational position information detected through the sensor.

The control means may be configured to rotate the snack box to control the snack in the snack box to be discharged to an outside through the discharge hole according to at least one of a control signal received from a user terminal provided separately, a control signal received from a user interface provided in the training robot, and a control signal set to discharge the snack every a previously set time.

The control means may be configured to control the first driving means to drive the moving means according to a pet training program such that the training robot moves and when a movement of the robot is finished according to the pet training program, control the second driving means to rotate the snack box such that the snack in the snack box is discharged to the outside through the discharge hole.

The training robot may further include a posture detection sensor configured to sense a posture of the training robot, wherein the control means is configured to control the training robot to maintain a normal posture based on a detection signal received from the posture detection sensor and then control the snack box to rotate such that the snack in the snack box is discharged to the outside through the discharge hole.

The training robot may further include a posture sensor configured to sense a posture of the training robot, wherein the control means is configured to analyze a tendency of the pet to play with the training robot based on data of a posture change of the training robot received from the posture detection sensor.

The training robot may further include an obstacle detection sensor capable of detecting surroundings of the training robot in real time, wherein the control means is configured to control the snack box to rotate such that the snack in the snack box is discharged through a discharge hole connected to the outside when the pet is determined to approach within a predetermined distance based on a signal received from the obstacle detection sensor.

The training robot may further include a posture detection sensor configured to sense a posture of the training robot; and an obstacle detection sensor capable of detecting surroundings of the training robot in real time, wherein the control means is configured to calculate a time for which the pet stays for each space based on signals received from the posture detection sensor and the obstacle detection sensor, and move the training robot to a space where the pet stays for a long time or a space where the pet does not frequently visit, and then control the snack box to rotate such that the snack in the snack box is discharged to the outside through the discharge hole.

The training robot may further include a discharge detection sensor configured to detect whether the snack has been discharged through the discharge hole, wherein the control means is configured to control the snack box to rotate once more such that the snack in the snack box is discharged to the outside through the discharge hole when the snack is not discharged based on a signal received from the discharge detection sensor.

Advantageous Effects

According to the disclosed present invention, since the present invention has a structure of discharging a snack by rotating a snack box, and thus the structure may be simplified and miniaturized.

Also, not only the snack box may be easily mounted on a training robot but also the snack box may be easily separated from the training robot, and thus the snack box may be easily cleaned.

Further, the snack box is controlled to return to its original position after rotation and a cover is installed at the opposite side of the snack box, and thus a snack may be prevented from being abnormally discharged to the outside.

DETAILED DESCRIPTION OF THE PREFERRED EMBODIMENT

Hereinafter, the present invention will be described in detail with reference to the accompanying drawings.

Figure 1:
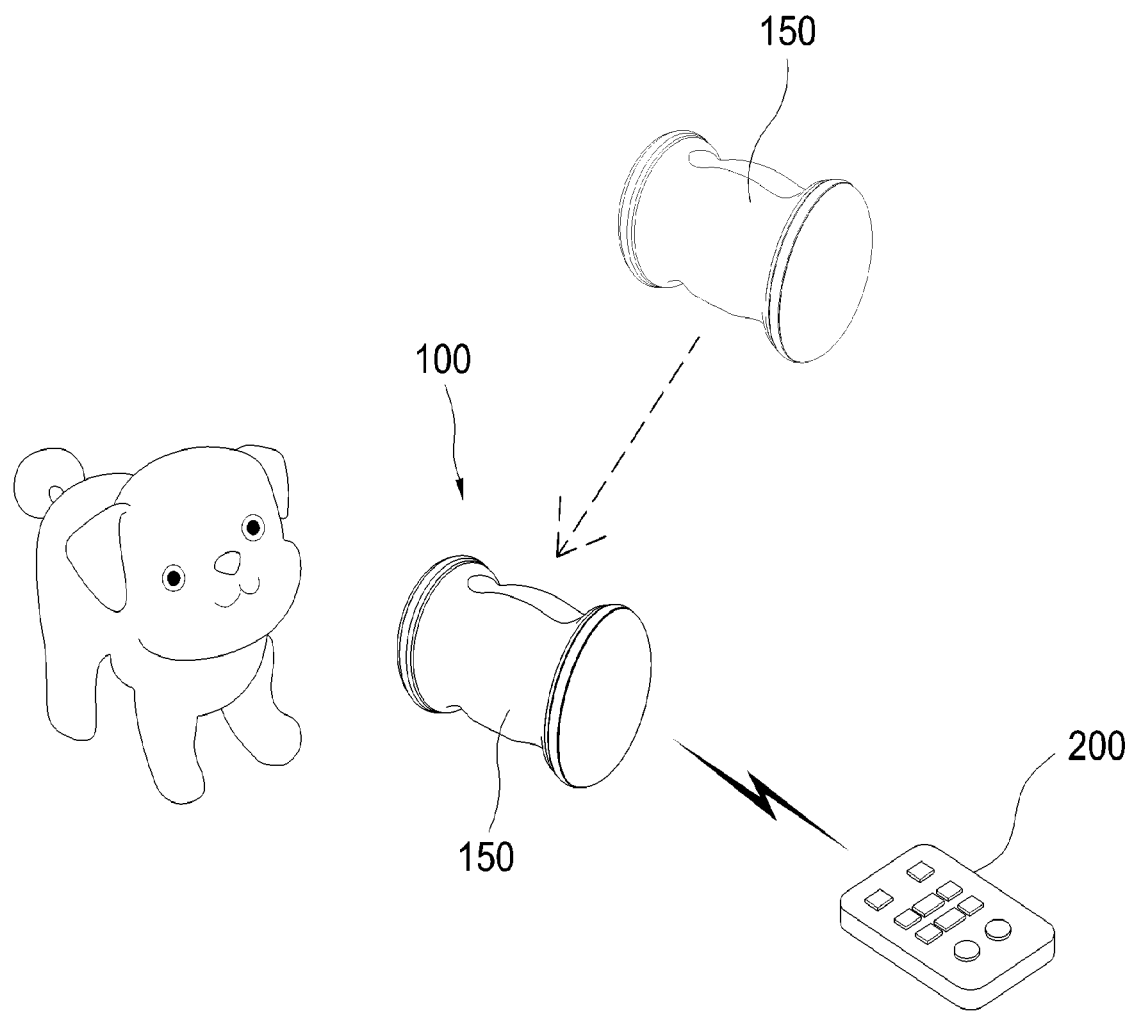
FIG. 1 is a diagram for explaining a driving method of a training robot having a snack discharging function for health promotion of a pet according to an embodiment of the present invention.

FIG. 1 is a diagram for explaining a driving method of a training robot having a snack discharging function for health promotion of a pet according to an embodiment of the present invention.

A training robot 100 having the snack discharging function for health promotion of the pet includes a housing 150, and is movable according to a control signal from a terminal 200 capable of wireless communication, and thus the pet may follow the training robot 100.

The training robot 100 having the snack discharging function for health promotion of the pet may discharge a snack in a snack box to the outside according to the control signal from the terminal 200 capable of wireless communication. Here, the terminal 200 may be a device capable of transmitting signals through various wireless communication methods such as infrared communication, Wi-Fi, and the like. For example, the terminal 200 may be various types of devices capable of wireless communication such as a remote controller, a mobile phone, and the like.

Figure 2:
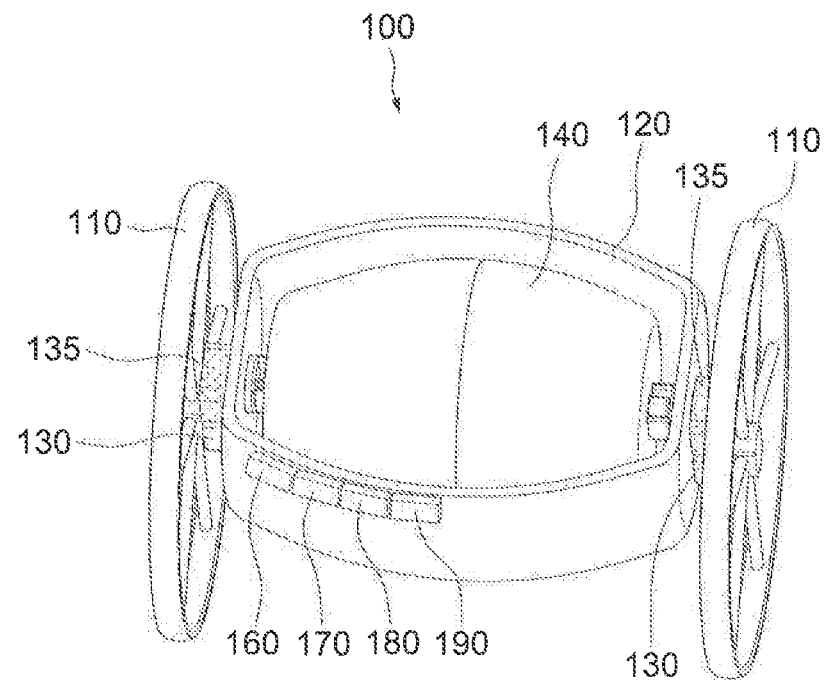
FIG. 2 is a diagram for specifically explaining a training robot having a snack discharging function for health promotion of a pet according to an embodiment of the present invention.

FIG. 2 is a diagram for specifically explaining a training robot having a snack discharging function for health promotion of a pet according to an embodiment of the present invention.

Referring to FIGS. 1 and 2, the training robot 100 having the snack discharging function may include a moving means 110, a base 120, a first driving means 130, a second driving means 135, a snack box 140, a housing 150, a control means 160, a position detection sensor 170, a posture detection sensor 180, and an obstacle detection sensor 190.

The moving means 110 is capable of moving the training robot 100. In the present invention, the moving means 110 will be described as a wheel type, but is not limited thereto, may be variously implemented.

The base 120 may include an insertion groove into which the snack box 140 including a discharge hole connected to an external space may be inserted. The base 120 will be described later with reference to FIG. 3.

The first driving means 130 may be disposed between the moving means 100 and the base 120 and may be mechanically connected to the moving means 100. The first driving means 130 may move the training robot 100 by driving the moving means 110 according to a control signal of the control means 160. Accordingly, the first driving means 130 may move the training robot 100 in various directions and speeds according to the control signal.

The second driving means 135 may be disposed between the moving means 100 and the base 120 and may be mechanically connected to the snack box 140. The second driving means 135 may rotate the snack box 140 according to the control signal of the control means 160 and discharge a snack present in the snack box 140 to the outside.

The snack box 140 may include a space for containing the snack of the pet and may include a snack box hole for inserting or discharging the snack of the pet.

Also, since the snack box 140 may be realized by coupling two boxes, it is easy to separate the boxes, and thus a user may easily clean the snack box 140. A detailed description thereof will be given later with reference to FIGS. 4 and 5.

The housing 150 may cover components of the training robot 100 except for the moving means 110.

The control means 160 may integrally control the components included in the training robot 100. For example, the control means 160 may control the first driving means 130 to drive the moving means 110 to move the training robot 100. For another example, the control means 160 may rotate the snack box 140 to control the snack in the snack box 140 to be discharged to the outside through the discharge hole.

The control means 160 may output sound set through a sound output means (not shown), and then rotate the snack box 140 to discharge the snack. Accordingly, if a specific sound is generated in the pet, it may be used for training by recognizing that the snack is discharged.

The position detection sensor 170 may determine a rotational position of the snack box 140. For example, the position detection sensor 170 may determine how many degrees the snack box 140 has rotated from its original position. For example, the position detection sensor 170 may be implemented in various forms such as a variable resistor, an infrared sensor, a gyro sensor, and the like.

The posture detection sensor 180 may sense a posture of the training robot 100. For example, the posture detection sensor 180 may be implemented as a gyro sensor or the like, and determine which azimuth angle the training robot 100 has from its original position. The control means 160 may determine whether the training robot 100 is inclined or inverted based on a signal received from the posture detection sensor 180.

The obstacle detection sensor 190 may sense surroundings of the training robot 100 in real time. The control means 160 may determine whether the pet is approaching based on a signal received from the obstacle detection sensor 190, determine fixed objects in a surrounding space, and determine a time that the pet stays for each space or the like. When it is determined that the pet approaches within a set distance based on the signal received from the obstacle detection sensor 190, the control means 160 may control the snack box 140 to rotate the snack box 140 and discharge the snack inside the snack box 140 through a discharge hole connected to the outside.

Figure 3:
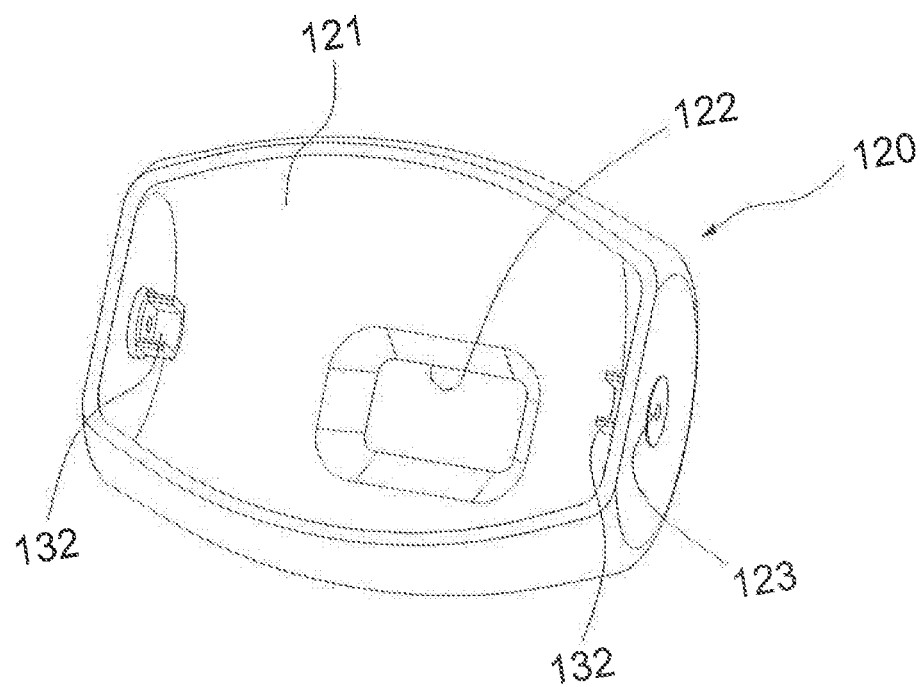
FIG. 3 is a diagram for specifically explaining a base according to an embodiment of the present invention.

FIG. 3 is a diagram for specifically explaining a base according to an embodiment of the present invention.

Referring to FIGS. 2 and 3, the base 120 may include an insertion groove 121, a discharge hole 122, and engagement holes 123.

The insertion groove 121 may be a groove into which the snack box 140 may be inserted. The insertion groove 121 may have a depth at which a part of the snack box 140 is exposed in a state where the snack box 140 is inserted such that a user may easily mount or remove the snack box 140.

The discharge hole 122 may be connected to an outer space, and may be a passage through which a snack discharged from the snack box 140 is discharged to the outside.

The engagement holes 123 may be formed at both sides of the base 120 and may mean holes through which fixing grooves 132 mechanically connected to the second driving means 135 pass. In other words, the engagement holes 123 may be engaged into the fixing grooves 132 that pass therethrough, and the fixing grooves 132 may be engaged into protrusions formed on both sides of the snack box 140.

Figure 4:
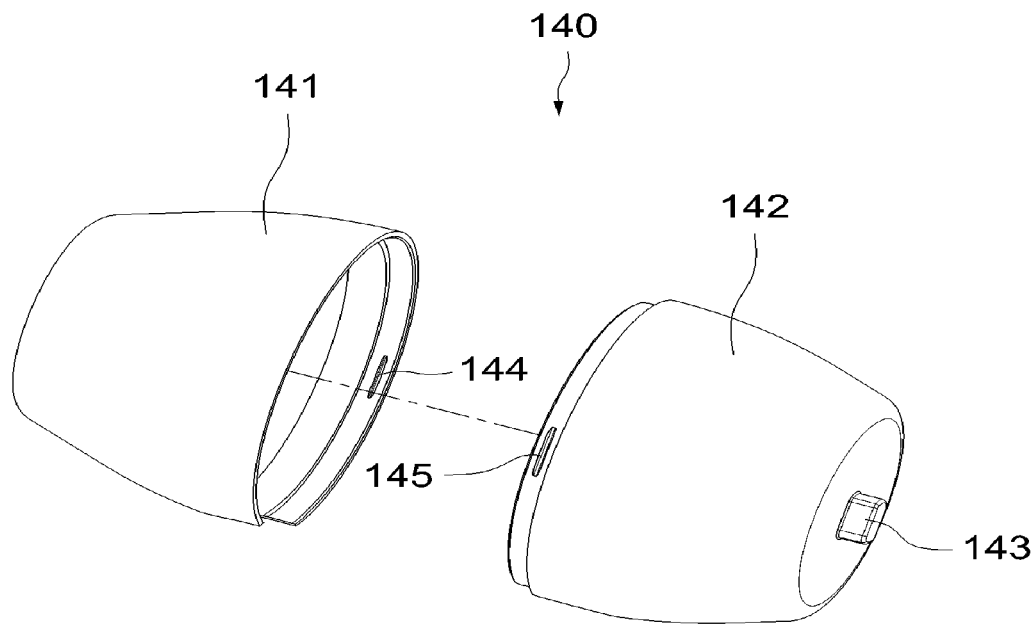
FIGS. 4 and 5 are diagrams for explaining a snack box according to an embodiment of the present invention.
Figure 5:
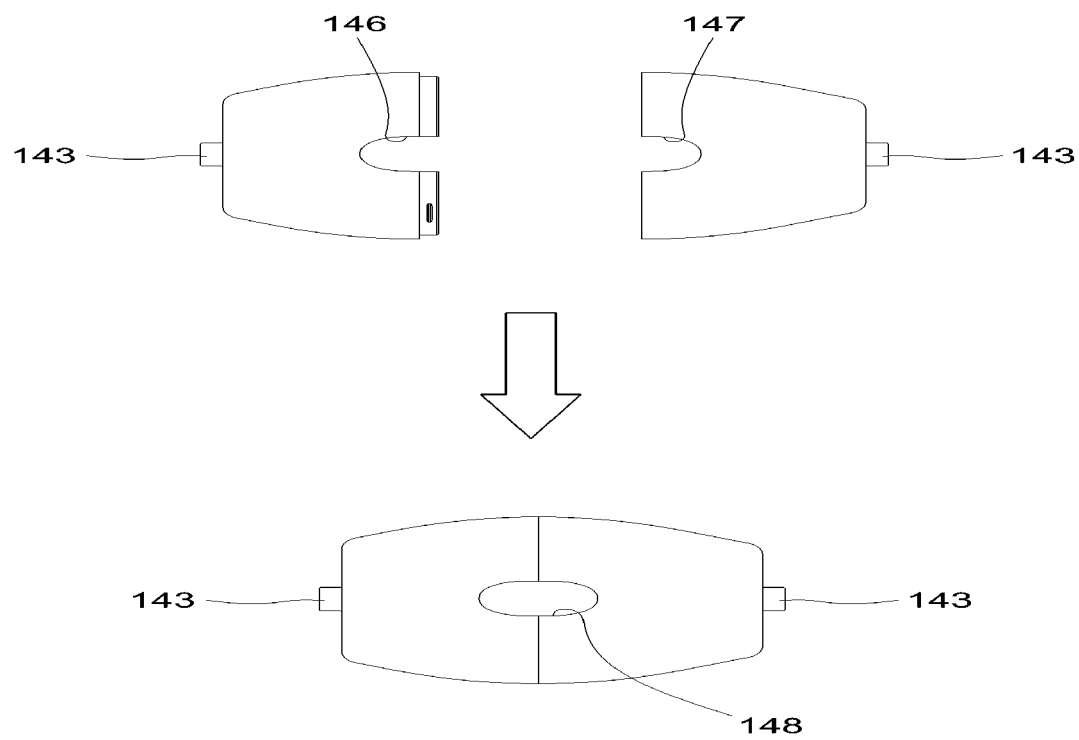

FIGS. 4 and 5 are diagrams for explaining a snack box according to an embodiment of the present invention.

Referring to FIGS. 2, 3 and 4, the snack box 140 may include a first box 141 having a fastening groove 144 and a second box having a projection 145 protruding therefrom to be fitted into the fastening groove 144. As described above, the snack box 140 may have a structure in which two boxes may be easily coupled and separated, and have a structure in which a user may easily separate and facilitate the cleaning.

Referring to FIGS. 2, 3 and 5, the snack box 140 may include protrusions 143 on both end surfaces thereof. The protrusions 143 may be fixedly coupled to the fixing grooves 132 connected to the driving means 130. Accordingly, the control means 160 may drive the second driving means 135 to rotate the snack box 140, thereby discharging a snack to an external space.

The snack box 140 may include the first box 141 including a half first hole 146 formed at an end thereof for inserting or discharging the snack, and the second box 142 including a half second hole 147 formed at an end of a part opposite to the first hole 146 for inserting or discharging the snack. In this case, as the first box 141 and the second box 142 are coupled to each other, the first hole 146 and the second hole 147 may be combined to form a completed snack box hole 148. The user may not only conveniently insert the snack through the snack box hole 148 but also conveniently separate the snack box 140 by inserting a finger into the snack box hole 148 when separating the snack box 140.

Figure 6:
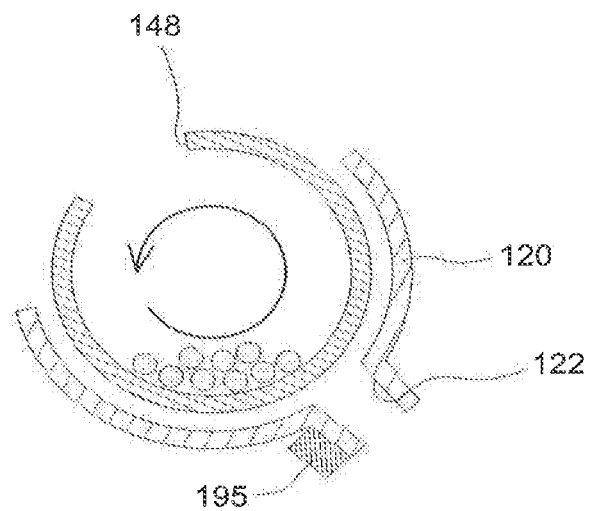
FIGS. 6, 7, and 8 are diagrams for explaining a snack box rotation control method according to an embodiment of the present invention.
Figure 6:
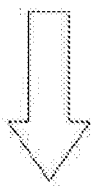
Figure 6:
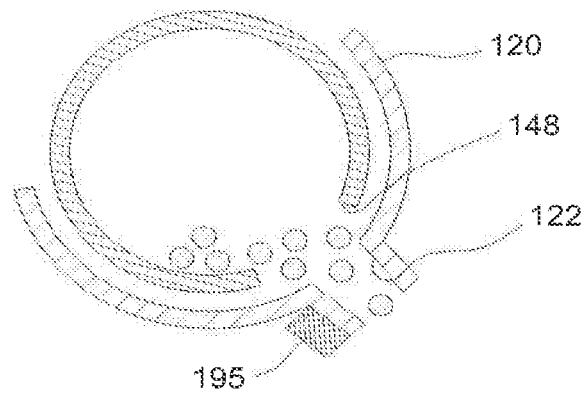
Figure 7:
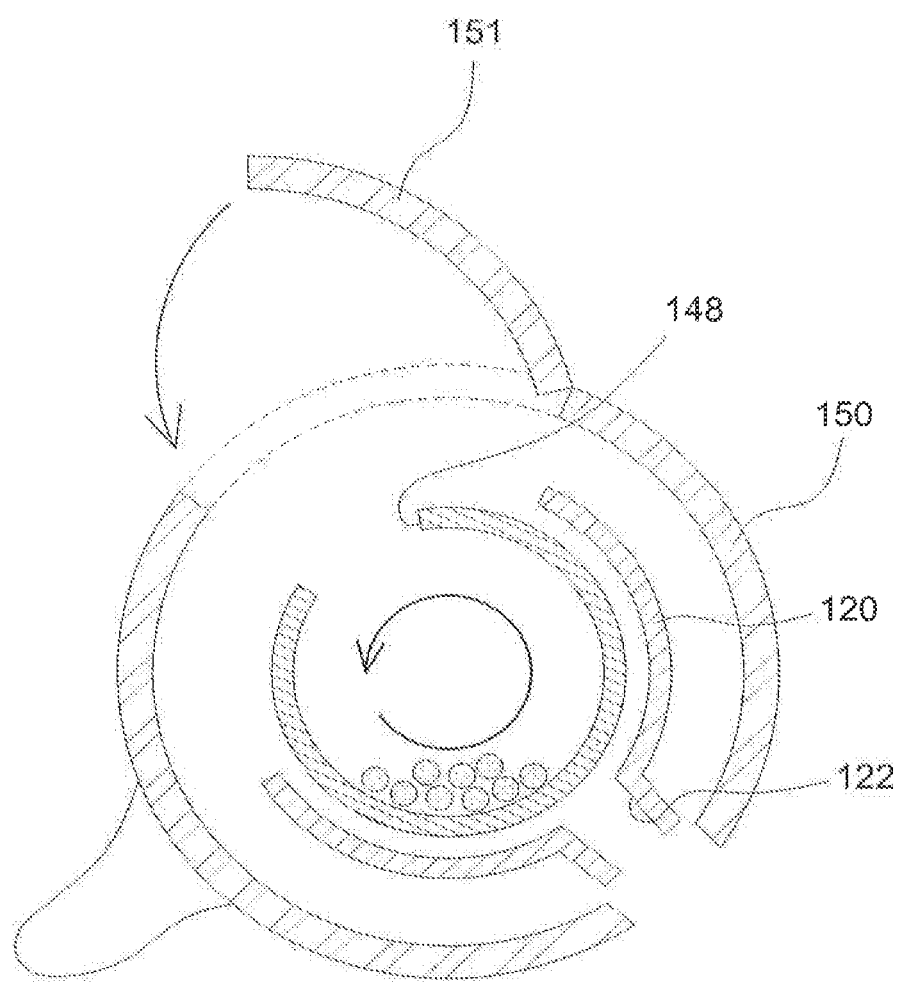
Figure 8:
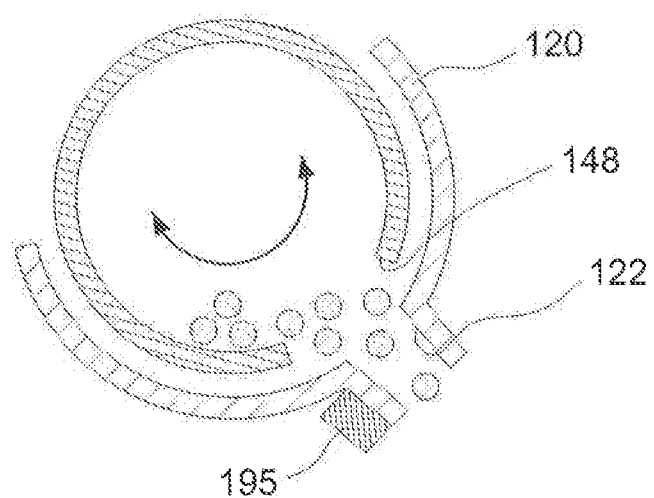

FIGS. 6, 7, and 8 are diagrams for explaining a snack box rotation control method according to an embodiment of the present invention.

FIG. 6 is a diagram for explaining a method of controlling a snack box to return to a specific position and stop after rotating the snack box.

Referring to FIGS. 2 and 6, the position sensing sensor 170 may determine a rotational position of the snack box 140.

The control means 160 may rotate the snack box 140 to control a snack in the snack box 140 to be discharged through the snack box hole 148 and the discharge hole 122.

Then, the control means 160 may control the snack box 140 to return to the specific position and stop using rotational position information obtained through the position sensing sensor 170. For example, the specific position may be an original position, but the specific position is not limited thereto and may be freely set by a user.

As described above, by controlling the snack box 140 to return to its original position, not only consistency of the snack box rotation may be precisely controlled, but also the snack box hole 148 may be directed downward, thereby preventing the snack from being inadvertently discharged through the discharge hole 122.

A discharge detection sensor 195 may sense whether the snack has been discharged through the discharge hole 122 and may be disposed near the discharge hole 122. When the snack is not discharged based on a signal received from the discharge detection sensor 195, the control means 160 may rotate the snack box 140 once more to control the snack in the snack box 140 to be discharged through the discharge hole 122 to the outside.

Thus, it may be sensed whether the snack has been discharged, thereby preventing a case where the snack is not discharged.

FIG. 7 is a diagram for explaining a method of controlling a snack box to return to a position opposite to a cover and stop after rotating the snack box.

Referring to FIGS. 2 and 7, the housing 150 may be positioned opposite to the snack box hole 148 and may be disposed adjacent to the snack box 140 inserted into the snack box hole 148, and may include a cover 151 used to insert or withdraw the snack box 140.

The control means 160 may rotate the snack box 140 to control a snack in the snack box 140 to be discharged through the snack box hole 148 and the discharge hole 121.

Next, the control means 160 may stop the snack box 140 such that the snack box hole 148 is positioned in a direction in which the cover 151 exists, using rotational position information obtained through the position sensing sensor 170.

As described above, by controlling the snack box 140 such that the snack box hole 148 is positioned in the direction in which the cover 151 exists, when a user opens the cover 151 and inserts the snack, not only the snack box hole 148 may be directed to the cover 151, thereby easily inserting the snack but also the snack box 140 may be directed downward, thereby preventing the snack from being inadvertently discharged through the discharge hole 121.

FIG. 8 is a diagram for explaining a method of controlling a snack to be discharged by shaking a snack box when the snack box approaches a discharge hole.

Referring to FIGS. 2 and 8, the control means 160 may determine whether the snack box hole 148 enters a predetermined distance from the discharge hole 122 by using rotational position information obtained through the position sensing sensor 170. For example, the control means 160 may determine whether the snack box hole 148 enters within 1 cm from the discharge hole 122.

When it is determined that the snack box hole 148 has entered the predetermined distance from the discharge hole 122, the control means 160 may control a snack of the snack box 140 to be easily discharged to the outside through the discharge hole 122 by repeatedly shaking the snack box 140 a predetermined number of times or a set rotation angle.

Figure 9:
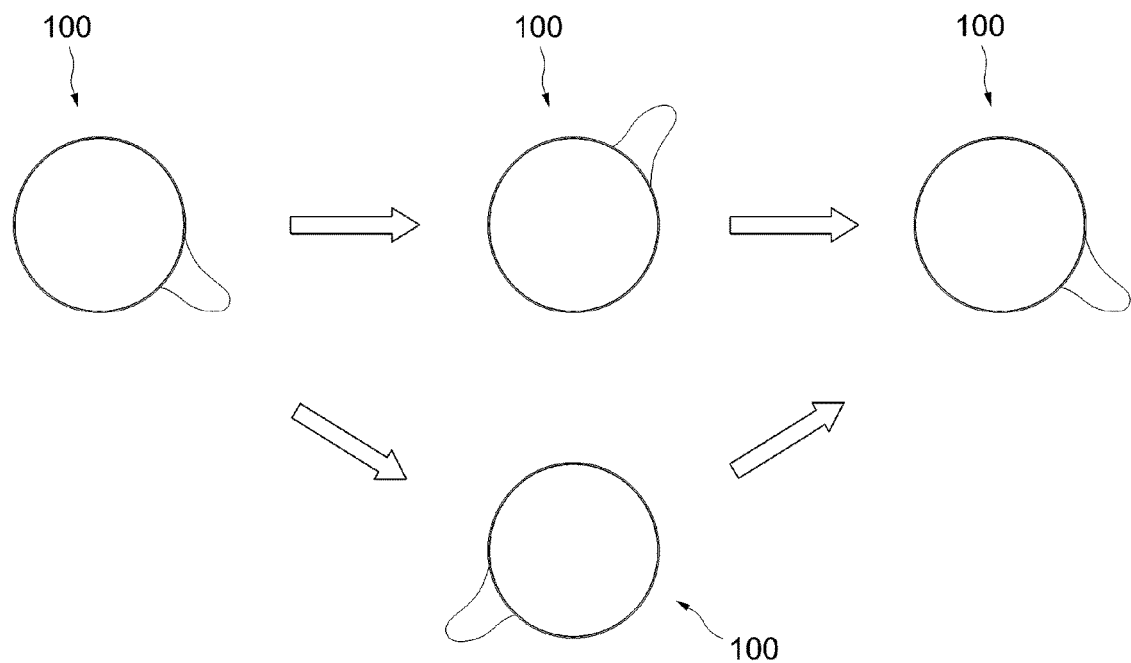
FIG. 9 is a diagram for explaining a method of detecting and controlling a posture of a training robot having a snack discharging function for health promotion of a pet according to an embodiment of the present invention.

FIG. 9 is a diagram for explaining a method of detecting and controlling a posture of a training robot having a snack discharging function for health promotion of a pet according to an embodiment of the present invention.

Referring to FIGS. 2 and 9, the control means 160 may control the training robot 100 to maintain a normal posture based on a sensing signal received from the posture detection sensor 180.

The training robot 100 may be tilted by a certain angle or inverted by 180 degrees by a pet. In this state, when a control signal for discharging a snack is received, the control means 160 may control the moving means 110 such that the posture of the training robot 100 becomes a normal posture.

Then, the control means 160 may rotate the snack box 140 to control the snack in the snack box 140 to be discharged to the outside through a discharge hole.

As described above, by allowing the training robot 100 to discharge the snack only in the normal posture, a function of discharging the snack may be prevented from being performed when the training robot 100 is in a different posture other than the normal posture by the pet and other factors.

The control means 160 may analyze a tendency of the pet by determining the tendency of the pet to play with the training robot 100 based on data of a posture change of the training robot 100 received from the posture detection sensor 180. For example, the control means 160 may receive the number of times the pet inverts or tilts the training robot 100, the number of times/distance of holding the training robot 100 in its mouth and moving, the number of times of touching the training robot 100, and the like and analyze the tendency of the pet.

Figure 10:
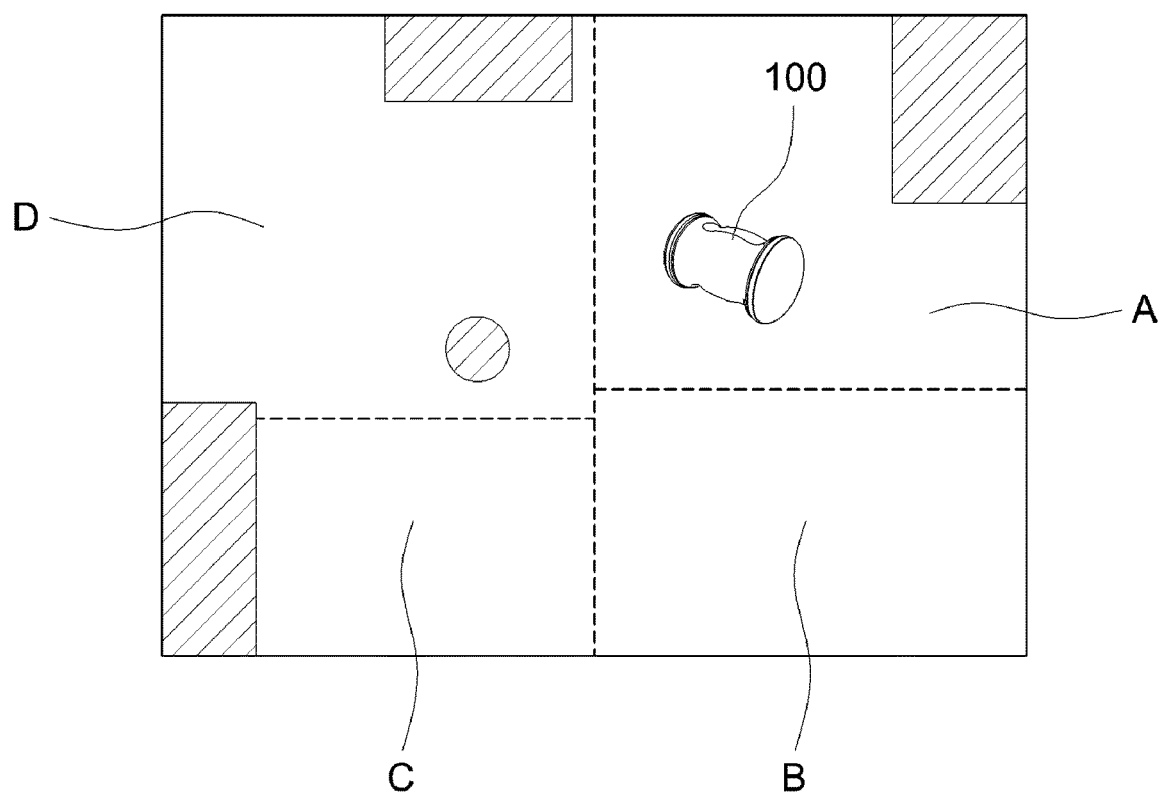
FIG. 10 is a diagram for explaining a method of detecting and controlling a snack discharge area of a training robot having a snack discharging function for health promotion of a pet according to an embodiment of the present invention.

FIG. 10 is a diagram for explaining a method of detecting and controlling a snack discharge area of a training robot having a snack discharging function for health promotion of a pet according to an embodiment of the present invention.

Referring to FIGS. 2 and 10, the control means 160 may calculate a time for which the pet stays for each of spaces A, B, C, and D based on signals received from the posture detection sensor 180 and the obstacle detection sensor 190.

The control means 160 may move the training robot 100 to a space where the pet stays for a long time ('friendly space') or a space where the pet does not frequently visit ('unfamiliar space'), and then rotate the snack box 140 to control a snack to be discharged to the outside through a discharge hole. In this regard, when there is no master, the training robot 100 may move to the space where the pet stays for a long time and give the snack to the pet such that the pet may have a sense of stability. Also, the training robot 100 may move to the space where the pet does not frequently visit and give the snack to the pet such that the pet may be trained to reduce the fear of the unfamiliar space.

The control means 160 may rotate the snack box 140 to control the snack in the snack box 140 to be discharged to the outside through the discharge hole according to at least one of a control signal received from a user terminal provided separately, a control signal (a 'manual control method') received from a user interface provided in the training robot 100, and a control signal (an 'automatic control method') set to discharge the snack for every a previously set time. For example, when the snack is set to be discharged once every 30 minutes, the control means 160 may control the training robot 100 to automatically discharge the snack once every 30 minutes.

The control means 160 may control the first driving means 130 to drive the moving means 110 according to a pet training program such that the training robot 100 moves and when a movement of the training robot 100 ends according to the pet training program, and may control the snack box 140 to rotate such that the snack in the snack box 140 is discharged to the outside through the discharge hole.

For example, when the pet training program rotates a circle of a 2M radius five times after repeating 3 times each of the left and right 3M, the control means 160 may move the training robot 100 according to the pet training program. In this case, since the pet follows the training robot 100, the pet may be exercised. Then, the pet may be recognized by the 5 control means 160 that the snack is provided if the pet follows the training robot 100 by discharging the snack. By using this method, even if there is no master, the pet may be exercised according to the pet training program.

The embodiments described above may be configured by 10 selectively combining all or some of the embodiment such that various modifications may be made.

It should also be noted that the embodiments are for the purpose of illustration and not for the purpose of limitation. In addition, it will be understood by those of 15 ordinary skill in the art that various embodiments are possible within the scope of the technical idea of the present invention.

The invention claimed is:

1. A training robot having a snack discharging function for health promotion of a pet, the training robot comprising:
   a moving means;
   a base having an insertion groove into which a snack box comprising a discharge hole connected to an external space may be inserted;
   a first driving means disposed between the moving means and the base and connected to the moving means;
   a second driving means disposed between the moving means and the base and connected to the snack box; and
   a control means configured to control a snack in the snack box to be discharged to an outside through the discharge hole;
   wherein the first driving, means drives the moving means to move the training robot and the second driving means rotates the snack box; and
   the training robot further comprises a housing surrounding the base to prevent the pet from touching the snack box;
   the inserting groove of the base has a depth at which a part of the snack box is exposed in a state where the snack box is inserted;
   the snack box further includes a snack box hole; and
   the control means is configured to control the snack box hole of the snack box to stop in a direction in which a cover exists by using the rotational position information detected through the sensor.

2. A training robot having a snack discharging function for health promotion of a pet, the training robot comprising:
   a moving means;
   a base having an insertion groove into which a snack box comprising a discharge hole connected to an external space may be inserted;
   a first driving means disposed between the moving means and the base and connected to the moving means;
   a second driving means disposed between the moving means and the base and connected to the snack box; and
   a control means configured to control a snack in the snack box t be discharged to an outside through the discharge hole;
   wherein the first driving means drives the moving means to move the training robot and the second driving means rotates the snack box; and
   the training robot further comprises a position detection sensor capable of detecting a rotational position of the snack box;
   the snack box further includes a snack box hole; and
   the control means is configured to control the snack in the snack box and rotate the fixing groove to rotate the snack to be easily discharged to the outside through the discharge hole by shaking the snack box by a predetermined number of times when the snack box hole enters a set distance from the discharge hole using rotational position information detected through the sensor.

3. A training robot having a snack discharging function for health promotion of a pet, the training robot comprising:
   a moving means;
   a base having an insertion groove into which a snack box comprising a discharge hole connected to an external space may be inserted;
   a first driving means disposed between the moving means and the base and connected to the moving means;
   a second driving means disposed between the moving means and the base and connected to the snack box; and
   a control means configured to control a snack in the snack box to be discharged to an outside through the discharge hole;
   wherein the first driving means drives the moving means to move the training robot and the second driving means rotates the snack box; and
   the training robot further comprises a posture detection sensor configured to sense a posture of the training robot;
   the control means is configured to control the training robot to maintain a normal posture based on a detection signal received from the posture detection sensor and then control the snack box to rotate such that the snack in the snack box is discharged to the outside through the discharge hole.

4. A training robot having a snack discharging function for health promotion of a pet the training robot comprising:
   a moving means;
   a base having an insertion groove into which a snack box comprising a discharge hole connected to an external space may be inserted;
   a first driving means disposed between the moving means and the base and connected to the moving means;
   a second driving means disposed between the moving means and the base and connected to the snack box; and
   a control means configured to control a snack in the snack box to be discharged to an outside through the discharge hole;
   wherein the first driving means drives the moving means to move the training robot and the second driving means rotates the snack box; and
   the training robot further comprises an obstacle detection sensor capable of detecting surroundings of the training robot in real time, the control means is configured to control the snack box to rotate such that the snack in the snack box is discharged through a discharge hole connected to the outside when the pet is determined to approach within a predetermined distance based on a signal received from the obstacle detection sensor.

5. A training robot having a snack discharging function for health promotion of a pet, the training robot comprising:

a moving means;

a base having an insertion groove into which a snack box comprising a discharge hole connected to an external space may be inserted;

a first driving means disposed between the moving means and the base and connected to the moving means;

a second driving means disposed between the moving means and the base and connected to the snack box; and a control means configured to control a snack in the snack box to be discharged to an outside through the discharge hole;

wherein the first driving means drives the moving means to move the training robot and the second driving means rotates the snack box; and the training robot further comprising:

a posture detection sensor configured to sense a posture of the training robot; and an obstacle detection sensor capable of detecting surroundings of the training robot in real time;

the control means is configured to calculate a time for which the pet stays for each space based on signals received from the posture detection sensor and the obstacle detection sensor, and move the training robot to a space where the pet stays for a long time or a space where the pet does not frequently visit, and then control the snack box to rotate such that the snack in the snack box is discharged to the outside through the discharge hole.

* * * * *